United States Patent [19]

Kastner

[11] 3,775,753

[45] Nov. 27, 1973

[54] VECTOR ORDER COMPUTING SYSTEM

[75] Inventor: William D. Kastner, Austin, Tex.

[73] Assignee: Texas Instruments Incorporated, Dallas, Tex.

[22] Filed: Jan. 4, 1971

[21] Appl. No.: 103,629

[52] U.S. Cl. .......... 340/172.5

[51] Int. Cl. .......... G06f 7/20, G06f 7/34

[58] Field of Search .......... 340/172.5, 146.3

[56] References Cited

UNITED STATES PATENTS

| | | | |
|---|---|---|---|
| 3,248,528 | 4/1966 | Campeau | 340/172.5 |
| 3,343,140 | 9/1967 | Richmond et al. | 340/172.5 |
| 3,440,611 | 4/1969 | Falkoff et al. | 340/172.5 |
| 3,509,542 | 4/1970 | Ehrman | 340/172.5 |
| 3,508,204 | 4/1970 | Cutaia | 340/172.5 |
| 3,311,892 | 3/1967 | O'Connor et al. | 340/172.5 |
| 2,987,705 | 6/1961 | Van Mechelen | 340/172.5 |
| 3,541,516 | 11/1970 | Senzig | 340/172.5 |
| 3,573,851 | 4/1971 | Watson et al. | 340/172.5 |
| 3,380,029 | 4/1968 | Goetz | 340/172.5 |
| 2,901,732 | 8/1959 | Canning | 340/172.5 |
| 3,399,383 | 8/1968 | Armstrong | 340/172.5 |
| 3,428,946 | 2/1969 | Batcher | 340/146.2 |

*Primary Examiner*—Paul J. Henon
*Assistant Examiner*—Jan E. Rhoads
*Attorney*—James O. Dixon, Andrew M. Hassell, Harold Levine, Rene E. Grossman, Melvin Sharp and James T. Comfort

[57] ABSTRACT

A computing system is specifically adapted for the performance of vector operations. A computing system takes two vector streams and orders the elements of those vector streams into a single ordered vector stream. Each vector stream is received in a different receiver register with each vector being clocked down through the computing system. The elements of the vector streams are compared and ordered into a single ordered vector stream.

2 Claims, 1 Drawing Figure

PATENTED NOV 27 1973 3,775,753

Figure 1:
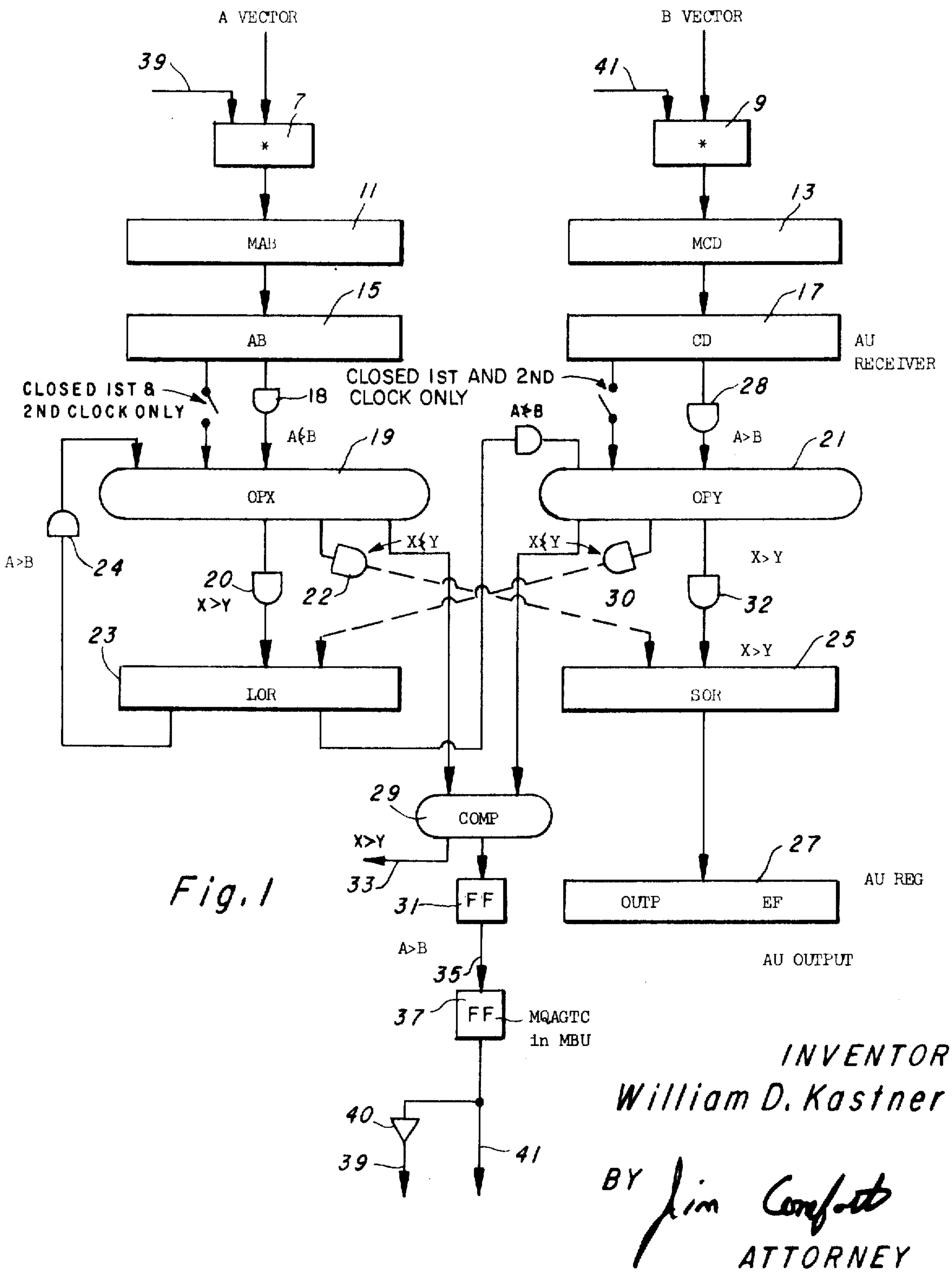

INVENTOR
William D. Kastner
BY Jim Comfort
ATTORNEY

VECTOR ORDER COMPUTING SYSTEM

The present invention is related to a computing system specifically adapted for the performance of vector operations. The invention is specifically directed to a computing system which can take two vector streams and order the elements of these two vector streams into a single vector stream containing groups of ordered elements.

It is an object of this invention to provide a new and improved computing system particularly adapted for vector operations.

It is another object of this invention to provide a new and improved computing system adapted for vector operations which can order the elements of two vector streams in a single ordered vector stream containing groups of ordered elements.

A vector X is the ordered array of elements $(x_1, x_2, x_3, \ldots, x_{\nu(x)})$. The variable $x_i$ is called the $i$th component of the vector X, and the number of components, denoted by $\nu(x)$ (or simply $\nu$ when the determining vector is clear from context), is called the dimension of $x$. A numerical vector X may be multiplied by a numerical quantity $k$ to produce the scaler times vector multiply $k \times X$ (or $kX$) defined as the vector Z such that $z_i = k \times x_i$.

All elementary operations defined on individual variables are extended consistently to vectors as component-by-component operations. For example, $$Z = X + Y \leftrightarrow z_i = x_i + y_i,$$
$$Z = X \times Y \leftrightarrow z_i = x_i \times y_i,$$
$$Z = X \div Y \leftrightarrow z_i = x_i \div y_i,$$
$$Z = |X| \leftrightarrow z_i = |x_i|,$$
$$W = U \wedge V \leftrightarrow w_i = u_i \wedge v_i,$$
$$W = (X < Y) \leftrightarrow w_i = (x_i < y_i).$$

Thus if $X = (1,0,1,1)$ and $Y = (0,1,1,0)$ then $X + Y = (1,1,2,1)$, $X \wedge Y = (0,0,1,0)$, and $(X < Y) = (0,1,0,0)$.

A matrix M is the ordered two-dimensional array of variables $$M_1^1, M_2^1, \ldots, M_{\nu(M)}^1$$
$$M_1^2, M_2^2, \ldots, M_{\nu(M)}^2$$
$$M_1^{\mu(M)}, \ldots, M_{\nu(M)}^{\mu(M)}$$

The vector $(M_1^i, M_2^i, \ldots, M_{\nu(M)}^i)$ is called the $i$th row vector of M and is denoted by $M^i$. Its dimension $\nu(M)$ is called the row dimension of the matrix. The vector $(M_j^1, M_j^2, \ldots, M_j^{\mu(M)})$ is called the $j$th column vector of M and is denoted by $M_j$. Its dimension $\mu(M)$ is called the column dimension of the matrix.

The variable $M_j^i$ is called the $(i,j)$th component or element of the matrix. Operations defined on each element of a matrix are generalized component by component to the entire matrix. Thus, if 0 is any binary operator, $$P = M \; O \; N \leftrightarrow P_j^i = M_j^i \; O \; N_j^i.$$

In the drawings,

FIG. 1 shows the system for carrying out the ordering of two vector traces.

TABLE 1 shows two vector streams and the results of ordering these two vector streams into a single vector stream.

TABLE 2 shows the timing sequence in the system shown in FIG. 1 for ordering the vector stream shown in TABLE 1.

TABLE 3 shows decimal coding of the vector streams shown in TABLE 1.

The hardware and logic shown in the drawings is contained in the arithmetic unit of the stored program computer. The inputs to the system are from the memory buffer unit and the outputs are back to the memory buffer unit. The clock pulses and control signals are from the read only memory control unit of the computer. The configuration of such a computer is shown in co-pending application, Ser. No. 744,190, by William D. Kastner et al., filed on July 11, 1968, and the Continuation-in-Part filed Apr. 28, 1972, and assigned to the same assignee as the present application.

Referring now to FIG. 1, which shows the system for ordering the A and B vectors shown in TABLE 2, the vector stream A is applied from memory through gate 7 to the memory buffer register MAB 11. From the memory buffer register MAB 11 the A vector stream is applied to the AB receiver register 15. At the same time, the B vector is clocked down starting through the gate 9 to the MCD buffer register 13 to the CD receiver register 17. The contents of the AB receiver register 15 are transferred through AND gate 18 to the A selection logic unit 19. The AB receiver register 15 is connected directly to the selection unit 19 at the first and second clock times only. For the other clock pulses, it is connected to the gate circuit 18. The selection unit 19 may be connected either through a gate 20 to a large operand register 23 or through a gate 22 to the small operand register 25. The large operand register 23 may be connected either through a gate 24 to the selection unit 19 or through a gate 26 to the selection unit 21. The CD receiver register 17 is connected through a gate 28 to the selection unit 21. The selection unit 21 may be connected either through a gate 30 to the large operand register 23 or through a gate 32 to the small operand register 25. The small operand register 25 is connected to an EF output register 27. The selection units 19 and 21 are connected to a comparison circuit 29 which compares the contents of these two selection units and sets a flip-flop 31 according to the outcome of the comparison circuit. Signals at the input to and the output from flip-flop 31 control the gates between the various elements of the system. The specific control connection is shown by the logic equation beside each of the inputs to the gates.

The direct line output from the comparison circuit 29 labelled 33 controls the XY gates 20, 22, 30 and 32 while the output from the flip-flop register 31 on output terminal 35 controls the gates 7, 9, 18, 24, 26 and 28 in the AB comparison. Flip-flop 31 is connected to flip-flop 37 in the memory buffer unit. One output 41 of flip-flop 37 goes to AND gate 9. The other output of flip-flop 37 is inverted by inverting circuit 40 and is the enable line 39 to the AND gate 7, controlling the A vector transfer into MAB register 11. Line 41 controls the B vector transfer into MCD register 13.

The operation of this system can be understood specifically by referring to TABLES 1 and 2 and FIG. 1 for a specific example. In this specific example, the vector stream A is shown, the vector stream B is shown and the output stream C is shown. The coding in TABLES 1 and 2 is in hexadecimal and is converted to decimal in TABLE 3. TABLE 2 starts with clock pulse zero and continues to clock pulse 35.

The timing clock pulses are shown across the top of TABLE 2 with the parts of the system shown along the left-hand side of TABLE 2. The specific position or location of the elements of the vector traces in the elements of the system are shown for each clock pulse time.

In TABLE 2, the ones and zeroes which are shown in the timing chart for the output for the QAGTC line are the outputs from flip-flop 31 on output terminals 33 and 35. The ones and zeros which are circled indicate an output resulting from an XY comparison on output terminal 33 and the ones and zeroes not circled result from the state of flip-flop 31 as seen on output terminal 35. At clock pulse 1, X is greater than Y.

At clock pulse time 0, the first element in the A vector stream (0929) is stored in the MAB register 11 and the first element in the B vector stream (0355) is stored in the MCD register 13. At clock pulse one, element 0929 is transferred to the AB receiver register 15 and element 0355 is transferred to the CD receiver register 17. Thus the first element (0929) in the A vector stream is stored in the AB register 15 and the first element (0355) in the B vector stream is stored in the CD register 17. At clock pulse one, the first A vector element (0929) is also in the selection unit 19 and the first B element (0355) in the B vector stream is in the selection unit 21. Therefore, 0929 is in the AB receiver register 15 and in the selection unit 19 and the element 0355 is in the CD receiver register 17 and in the selection unit 21 at clock pulse 1.

The XY comparison is a comparison of the contents of the selection units 19 and 21 with the contents of the selection unit 19 being X and the contents of the selection unit 21 being Y for the purposes of the comparison. The XY comparison is carried out at one clock pulse with the flip-flop 31 holding the result of the XY comparison at the succeeding clock pulse. The AB comparison on output terminal 35 is labelled such only to distinguish between XY comparisons at different clock times.

At clock pulse 1, X is greater than Y so there is a 1 output at this time at clock pulse 1.

At clock pulse 2, A was greater than B so there is a 1 output signal on terminal 35 and the A element 0929 is stored in the large operand register 23 and the B element 0355 is stored in the small operand register 25. Also at clock pulse 2, the MAB register 11 receives the second A element (0000) and the MCD register 13 receives the second B element (FFOB). This is the second and last time that both memory buffer registers 11 and 13 will change at the same time. From now on, only one memory buffer register will change at a time. At clock pulse 3, the memory buffer unit flip-flop 37 picks up the output from the AB comparison from output terminal 35 as shown on the MQAGTC line of TABLE 2. At clock pulse 3 also, the second A element 0000 is transferred to the AB receiver register 15 and the second B element (FFOB) of the B vector is transferred to the CD receiver register 17. The 0PX selection unit 19 contains the first A element (0929) and the 0PY selection unit 21 contains the second B element (FFOB). The XY comparison output on output terminal 33 is 1. The output register EF 27 receives the lowest order element on clock pulse 3 which is the first B element 0355. The output register EF 27 always receives its data from the small operand register 25. This element is the first ordered element in the C vector stream which results from the ordering of the A and B vector streams.

At clock pulse 4 only one of the vector streams will provide an element to the MAB register 11 or the MCD register 13. In this specific example, the 0000 element which is the second element of the A vector stream remains in the MAB register 11 and the MCD register receives the 0008 element which is the third element in the B vector stream. The movement of the third element into the MCD register is a result of the MQAGTC flip-flop 37 being a 1 at clock time 3, which in turn resulted from the comparison between the first element of vectors A and B. The AB comparison results in a 1 from flip-flop 31 at clock pulse 4. Also at clock pulse 4, the large operand register 23 contains the first element in the A vector 0929 and the small operand register 25 contains the second element in the B vector stream FFOB.

At the fifth clock pulse, the XY output from the flip-flop 31 on output terminal 35 is applied to the memory buffer unit flip-flop 37, which in turn is applied to the memory buffer unit registers 11 and 13 using gates 7 and 9. The AB register 15 thus contains the second element in the A vector stream 0000, and the CD register 17 contains the third element in the B vector stream 0008. The 0PX selection unit 19 still contains the first element of the A vector stream (0929) and the 0PY selection unit 21 contains the third element (0008) of the B vector stream. The result of the AB comparison on output terminal 33 applied to the gates is 1, indicating that the A element (0929) in the 0PX selection unit 19 is larger than the B element (0008) in the 0PY selection unit 21. The EF output register at this time contains the second element (FFOB) in the B vector stream. This element (FFOB) thus becomes the second element in the C vector stream resulting from the ordering of the A and B vector streams.

This operation continues in the manner which has been described throughout the vector streams following the timing shown in TABLE 2 for the ordering of the A and B vector streams into the C vector stream as shown in TABLE 1.

These examples have resulted in the comparison circuit 29 providing a 1 on the XY output line 33, indicating that X is larger than Y. Starting at clock pulse 7, Y will become greater than X and zero will result on output terminal 33 and applied to the XY decision gates. This will result in an ordering of the vector element as shown in TABLE 1. It will cause a 0 to be applied to the memory buffer registers causing a selection of the next element in the A vector stream rather than the next element in the B vector stream as described for the specific ordering of the specific vector elements of TABLE 1.

The ordering of the elements in vector A and the elements in vector B into the ordered elements shown in the resulting vector stream C continues through the apparatus shown in FIG. 1 according to the timing chart shown in TABLE 2. This results in an ordered vector stream C as shown in TABLE 1 with the coding being shown in hexadecimal. TABLE 3 shows vector streams A, B and C being converted into a decimal form for ease of understanding this description.

TABLE 1
HEX

> ↓
A = 0929, 0000, FF29, 32C4, 0014, FDC8, FFFF, 02F0, 7FFF
>
B = 0355, FF0B, 0008, 1856, FF0B, 0060, 0000, FFFF, 7FFF
>
C = 0355, FF0B, 0008, 0929, 0000, FF29, 1856, FF0B, 0060, 0000, FFFF, 32C4, 0014, FDC8, FFFF, 02F0, 7FFF

TABLE 3
DECIMAL

>
A = 2345, 0, −215, 12996, 20, −568, −1, 752, 32767
>
B = 853, −245, 8, 6230, −245, 96, 0, −1, 23767
>
C = 853, −245, 8, 2345, 0, −215, 6230, −245, 96, 0, −1, 12996, 20, −568, −1, 752, 32767

TABLE 2

| | 0 | 1 | 2 | 3 | 4 | 5 | 6 | 7 |
|---|---|---|---|---|---|---|---|---|
| MAB 11 | 0929 | | 0000 | | 0000 | | 0000 | |
| MCD 13 | 0355 | | FF0B | | 0008 | | 1856 | |
| MQAGTC | | | | 1 | | 1 | | 1 |
| AB 15 | | 0929 | | 0000 | | 0000 | | 0000 |
| CD17 | | 0355 | | FF0B | | 0008 | | 1856 |
| ϕPX 19 | | 0929 | | 0929 | | 0929 | | 0929 |
| ϕPY 21 | | 0355 | | FF0B | | 0008 | | 1856 |
| QAGTC 35 | | ① | 1 | ① | 1 | ① | 1 | ① |
| LϕR 23 | | | 0929 | | 0929 | | 0929 | |
| SϕR 25 | | | 0355 | | FF0B | | 0008 | |
| EF 27 | | | | 0355 | | FF0B | | 0008 |

| | 8 | 9 | 10 | 11 | 12 | 13 | 14 | 15 |
|---|---|---|---|---|---|---|---|---|
| MAB 11 | 0000 | | FF29 | | 32C4 | | 0014 | |
| MCD 13 | FF0B | | FF0B | | FF0B | | FF0B | |
| MQAGTC | | 0 | | 0 | | 0 | | 1 |
| AB 15 | | 0000 | | FF29 | | 32C4 | | 0014 |
| CD 17 | | FF0B | | FF0B | | FF0B | | FF0B |
| ϕPX 19 | | 0000 | | FF29 | | 32C4 | | 32C4 |
| ϕPY 21 | | 1856 | | 2856 | | 1856 | | FF0B |
| QAGTC 35 | 0 | ⓪ | 0 | ⓪ | 0 | ① | 1 | ① |
| LϕR 23 | 1856 | | 1856 | | 1856 | | 32C4 | |
| SϕR 25 | 0929 | | 0000 | | FF29 | | 1856 | |
| EF 27 | | 0929 | | 0000 | | FF29 | | 1856 |

| | 16 | 17 | 18 | 19 | 20 | 21 | 22 | 23 |
|---|---|---|---|---|---|---|---|---|
| MAB 11 | 0014 | | 0014 | | 0014 | | 0014 | |
| MCD 13 | 0060 | | 0000 | | FFFF | | 7FFF | |
| MQAGTC | | 1 | | 1 | | 1 | | 1 |
| AB 15 | | 0014 | | 0014 | | 0014 | | 0014 |
| CD 17 | | 0060 | | 0000 | | FFFF | | 7FFF |
| ϕPX 19 | | 32C4 | | 32C4 | | 32C4 | | 32C4 |
| ϕPY 21 | | 0060 | | 0000 | | FFFF | | 7FFF |
| QAGTC 35 | 1 | ① | 1 | ① | 1 | ① | 1 | ① |
| LϕR 23 | 32C4 | | 32C4 | | 32C4 | | 32C4 | |
| SϕR 25 | FF0B | | 0060 | | 0000 | | FFFF | |
| EF 27 | | FF0B | | 0060 | | 0000 | | FFFF |

| | 24 | 25 | 26 | 27 | 28 | 29 | 30 | 31 |
|---|---|---|---|---|---|---|---|---|
| MAB 11 | 0014 | | FDC8 | | FFFF | | 02F0 | |
| MCD 13 | Garbage | | G | | G | | G | |
| MQAGTC | | 0 | | 0 | | 0 | | 0 |
| AB 15 | | 0014 | | FDC8 | | FFFF | | 02F0 |
| CD 17 | | 7FFF | | 7FFF | | 7FFF | | 7FFF |
| ϕPX 19 | | 0014 | | FDC8 | | FFFF | | 02F0 |
| ϕPY 21 | | 7FFF | | 7FFF | | 7FFF | | 7FFF |
| QAGTC 35 | 0 | ⓪ | 0 | ⓪ | 0 | ⓪ | 0 | ⓪ |
| LϕR 23 | 7FFF | | 7FFF | | 7FFF | | 7FFF | |
| SϕR 25 | 32C4 | | 0014 | | FDC8 | | FFFF | |
| EF 27 | | 32C4 | | 0014 | | FDC8 | | FFFF |

| | 32 | 33 | 34 | 35 | 36 | 37 | 38 | 39 |
|---|---|---|---|---|---|---|---|---|
| MAB 11 | 7FFF | | | | | | | |
| MCD 13 | G | | | | | | | |
| MQAGTC | | | | | | | | |
| AB 15 | | 7FFF | | | | | | |
| CD 17 | | 7FFF | | | | | | |
| ϕPX 19 | | 7FFF | | | | | | |
| ϕPY 21 | | 7FFF | | | | | | |
| QAGTC 35 | 0 | ⓪ | 0 | | | | | |
| LϕR 23 | 7FFF | | 7FFF | | | | | |
| SϕR 25 | 02F0 | | 7FFF | | | | | |
| EF 27 | | 02F0 | | 7FFF | | | | |

What is claimed is:

1. A computing system for ordering a first vector stream having an array of elements and a second vector stream having an array of elements into a third vector stream having sets of ordered elements comprising, a. a first buffer register for receiving said first vector stream one element at a time, b. a second buffer register for receiving said first vector stream one element at a time, c. an output register for temporary storage of the ordered third vector stream one element at a time, d. a first receiver register for storage of said first vector stream from said first buffer register one element at a time, e. a second receiver register for storage of said second vector stream from said second buffer register one element at a time, f. a first temporary storage register, g. a second temporary storage register, h. first selection means selectively connected to said first receiver register and said first temporary storage register for presenting the vector elements in said first temporary storage registers or said first receiver registers, i. second selection means selectively connected to said first temporary storage means and said second receiver register for presenting the vector elements in said first temporary storage register of said second receiver register, j. comparison means for comparing the vector elements presented in said first and second selection means according to predetermined criteria and transferring one of said vector elements into said first temporary storage register and one of said vector elements into said second temporary storage registers, and k. means responsive to said comparing means for transferring the vector element stored in said second temporary storage means to said output register as an element of said ordered third vector stream.

2. The computing system claimed in claim 1 including means responsive to said comparing means for selectively connecting said first temporary register to one of said selection means and one receiver registers to the other of said selection means to present an element from each of said first and second vector streams, said comparison means responsive to said selective correction for comparing said vector elements according to said predetermined criteria and transferring one of said vector elements into said first temporary register and one of said vector elements into said second temporary storage registers.

* * * * *